United States Patent
O'Connell et al.

(10) Patent No.: US 12,300,953 B2
(45) Date of Patent: *May 13, 2025

(54) SPRING LOADED GROUND CLAMP

(71) Applicant: Quanta Associates, L.P., Houston, TX (US)

(72) Inventors: Daniel Neil O'Connell, Burnaby (CA); Raymond Henry Jodoin, Burnaby (CA); Benjamin James Harvey, La Grange, TX (US)

(73) Assignee: Quanta Associates, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,457

(22) Filed: Oct. 9, 2023

(65) Prior Publication Data

US 2024/0039179 A1 Feb. 1, 2024

Related U.S. Application Data

(63) Continuation of application No. 17/586,456, filed on Jan. 27, 2022, now Pat. No. 11,817,665.

(Continued)

(30) Foreign Application Priority Data

Jan. 29, 2021 (CA) .................................. CA 3107483
Oct. 8, 2021 (CA) .................................. CA 3133635

(51) Int. Cl.
*H01R 4/66* (2006.01)
*H01R 4/48* (2006.01)
*H01R 4/64* (2006.01)

(52) U.S. Cl.
CPC ............. *H01R 4/66* (2013.01); *H01R 4/4863* (2013.01); *H01R 4/646* (2013.01)

(58) Field of Classification Search
CPC ........ H01R 4/66; H01R 4/4863; H01R 4/646; H01R 11/15; H01R 43/22
See application file for complete search history.

(56) References Cited

U.S. PATENT DOCUMENTS 1,777,395 A 10/1930 Coon
2,867,787 A 1/1959 Nilsson
(Continued)

FOREIGN PATENT DOCUMENTS

CA 3022937 11/2017

OTHER PUBLICATIONS

Corrales, Daniel, Supplementary European Search Report for EP 22 74 6618, Nov. 12, 2024, 10 pages, European Patent Office, Munich, Germany.

(Continued)

*Primary Examiner* — Renee S Luebke
*Assistant Examiner* — Paul D Baillargeon
(74) *Attorney, Agent, or Firm* — Oathout Law Firm; Antony C. Edwards; Laura Tu (57) ABSTRACT

A grounding clamp uses a spring driving a piston mounted movable jaw as a safety lockout. The movable jaw and a fixed jaw, which may include teeth, form a conductor clamp. The ground clamp mounts on the end of a hot stick to provide for electrically insulated remote operation of the ground clamp by a lineman holding the hot stick and pulling on, or releasing, a lever arm on the hot stick. The system provides increased safety for the lineman as the spring providing the spring loading of the clamp has a high spring force to overcome, thus providing the lockout. The lever arm on the hot stick tool provides mechanical advantage to overcome the spring force and thus release the lockout. The lineman cannot usefully operate the ground clamp manually without the hot stick due to spring force lockout.

16 Claims, 11 Drawing Sheets

Related U.S. Application Data (60) Provisional application No. 63/253,702, filed on Oct. 8, 2021, provisional application No. 63/143,418, filed on Jan. 29, 2021.

(56) References Cited

U.S. PATENT DOCUMENTS

| | | | | |
|---|---|---|---|---|
| 10,686,266 | B2* | 6/2020 | Rahman | H01R 4/5008 |
| 11,817,665 | B2* | 11/2023 | O'Connell | H02G 1/02 |
| 2018/0031794 | A1* | 2/2018 | Sakmar | G02B 6/48 |

OTHER PUBLICATIONS

Czaban, Jennifer, Examiner Requisition for CA 3,174,287, Jan. 31, 2024, 6 pages, Canadian Intellectual Property Office, Canada.
Czaban, Jennifer, Examiner Requisition for CA 3,133,635, Jan. 31, 2024, 6 pages, Canadian Intellectual Property Office, Canada.
Czaban, Jennifer, Examiner Requisition for CA 3,107,483, Jan. 31, 2024, 5 pages, Canadian Intellectual Property Office, Canada.

* cited by examiner

SPRING LOADED GROUND CLAMP

TECHNICAL FIELD

This disclosure relates to the field of clamping devices that removably clamp a ground cable onto an electrical conductor, and in particular to a ground clamp that releasably clamps onto an electrical conductor using only a fixed jaw and a high compression spring-loaded movable jaw, wherein the spring loaded jaw cannot be manually retracted away from the fixed jaw without the use of a customized hot stick, made to provide a lineman with a significant mechanical advantage so as to be able to retract the movable jaw from the fixed jaw.

BACKGROUND

Electrical workers use grounding cables regularly in the industry to handle dangerous voltage and current hazard on de-energized power lines and electrical equipment. Grounds are designed to be installed and removed using a long insulating tool, referred to herein as a hot stick, to keep the worker at a safe distance from the hazard.

When installing grounds, the first connection is always made to a ground or earth point. Workers will normally make this connection by hand instead of with the insulated hot stick, as there is no hazardous energy when making this connection.

Any time a connection is made to an electrical conductor or apparatus that could be at a different electrical potential from ground, this connection must be made using an insulating tool. This is especially true in a high voltage environment (for example, over 69 kV). Due to the design of conventional ground clamps, they can be installed and removed by hand instead of being installed using an insulating tool. It is not uncommon in applicant's experience for workers to make the mistake of installing a ground clamp on a conductor, or removing one from a conductor by hand instead of with an insulating tool. This potentially exposes the worker to a voltage and current potential and consequently may result in electrocution of the worker. To applicant's knowledge, this has accounted for fatalities and electrocution incidents in the industry.

Consequently, there is a need in the industry for a ground clamp that operates in combination with an insulating tool so as to prevent the worker or lineman from being able to operate the ground clamp without the use of the insulating tool. This is to inhibit workers or linemen from attempting to install or remove the ground clamp by hand. To accomplish this a lock out mechanism in the form of a strong spring having a large spring force is described below which prevents manual operation of the ground clamp as the ground clamp can only be actuated or un-locked with the customised insulating tool.

SUMMARY

A grounding clamp system according to the present disclosure includes a first jaw and a second jaw wherein the first jaw is a piston mounted movable jaw and the second jaw is fixed, and wherein the first and second jaws are in opposed facing relation so as to define a gap therebetween. The opposed facing surfaces of the first and second jaws may include serrations or teeth formed thereon. Improved electrical connection between the first and second jaws, for example within the housing rigidly coupled to the second jaw which houses the spring driving the piston of the first jaw, and between the head of the first jaw and the shank of the second jaw, may inhibit burning or welding occurring between the jaws or in the spring housing upon an extreme fault current surge through the grounding clamp.

The head of the first jaw is mounted on a piston or piston rod, used interchangeably herein, which is slidably mounted in the spring housing. The housing is coupled to the shank of the fixed second jaw so as to maintain the first and second jaws in their opposed facing relation. A very strong or heavy spring is mounted in the housing and is coupled to the piston to resiliently drive the piston and the head of the first jaw towards the opposed facing hook of the second jaw so as to resiliently close the gap between the first and second jaws. The spring has a spring force in the range of, for example, 140 to 250 pounds or more force required to fully compress the spring. For example, the spring force for clamping a smaller diameter conductor may be in the order of 145 pounds force, and the spring force for clamping a larger diameter conductor may be in the order of 220 pounds force. The head of the first jaw may have a contact flange to ride against a corresponding contact surface on the shank as the piston is driven parallel to the shank to open and close the jaws. The contact flange assists in maintaining electrical connection between the first and second jaws, and resists twisting of the head of the first jaw. The contact flange is preferably linear and the contact face planar and in electrically conductive contact with the contact flange. The spring may have conductive members such as washers, mounted, as for example by welding, to at least one end of the spring, and preferably to at least the upper end, or to both the upper and lower ends of the spring to increase the electrical contact between the spring and the piston rod or spring housing.

In preferred embodiments, at least one, and advantageously both, of opposed facing surfaces of the first and second jaws are concave surfaces, curved so as to conform to a curved outer surface of the conductor clamped between the first and second jaws so as to optimize penetrating spring force concentration to, and electrical connection with the conductor. The first and second jaws have corresponding first and second gripping surfaces in opposed facing relation, The first gripping surface may be smaller than the second gripping surface so that the penetrating spring force concentration of the first gripping surface acting on the conductor is increased relative to the penetrating spring force concentration of the second gripping surface acting on the conductor. Serrations, teeth or surface roughening are advantageously formed on one or both of the first and second gripping surfaces, and preferably at least on the smaller, movable jaw.

A hot stick connector, such as an eye mounted to the second end of the piston opposite the head of the first jaw, extends from the second end of the piston.

The system includes an insulated hot stick having a hook retractably mounted in a first end thereof. A tensioning rod linkage is coupled to the hook at one end of the rod linkage, and coupled at the other, opposite, end of the tensioning rod linkage to a lever arm. The lever arm is pivotally mounted on the hot stick, on handle end of the hot stick. The handle end of the hot stick is opposite the first end of the hot stick. The tensioning rod linkage is mounted to the lever arm at a mechanical advantage distance along the lever arm away from the hot stick.

The first end of the hot stick is adapted to have the housing seat thereon when the hook is engaged with the hot stick connector eye and the hook retracted to a first retracted position by rotation of the lever arm in a first direction so as to tension the tensioning rod linkage. In the first retracted position the hook pulls on the connector to seat the ground clamp onto the first end of the hot stick. Continued and increasing tension on the tensioning rod linkage by further rotation of the lever arm in the first direction away from the first end of the hot stick and towards the second end of the hot stick retracts the hook to a second, further retracted position wherein the piston, for example by a flange on the piston, compresses the spring against the return biasing spring force of the spring so as to retract the first jaw away from the second jaw to thereby open the gap so as to allow entry into or exit of a conductor from the gap between the jaws.

When the lever arm is rotated in a second direction opposite to the first direction, the return biasing spring force of the spring urges the first jaw towards the second jaw to thereby at least partly close the gap. This engages the jaws with a conductor positioned in the gap. The strong spring force keeps the first and second jaws tightly clamped on the conductor. In the embodiment wherein the first and second jaws have teeth or are serrated, the spring force firmly anchors the teeth or serrations with the soft outer aluminum strands of the conductor thereby improving the electrical connection between the grounding clamp jaws and the conductor.

The lever arm is rotated in the first direction to open the gap between the first and second jaws. The lever arm rotated in the second direction to at least partly close the gap so as to clamp a conductor between the first and second jaws.

Advantageously the tensioning rod linkage is pivotally mounted to the lever arm. Further advantageously the tensioning rod linkage includes first and second linear rods, wherein the first linear rod is coupled at a first end thereof to the hook and is slidably mounted to the first end of the hot stick so as to translate linearly along and parallel to the first end of the hot stick, and wherein the first linear rod is pivotally coupled at a second end thereof, opposite the first end of the first linear rod, to a first end of the second linear rod. The second end of the second linear rod, being pivotally mounted to the lever arm, is pivotable relative to the first linear rod so as to form a small included angle between the second linear rod and the hot stick as the lever arm is rotated to open and close the first and second jaws.

Yet further advantageously, the lever arm is an over-center lever arm releasably lockable into an over-center position when fully rotated in the first direction until the handle end of the lever arm is flush against the handle end of the hot stick.

DETAILED DESCRIPTION

As seen in the accompanying illustrations wherein like part numbers represent corresponding parts in each view, the present disclosure is a spring loaded grounding clamp system which employs a strong spring as a safety lockout for the ground clamp, wherein the jaws of the ground clamp may have teeth or may be serrated.

The system includes a ground clamp 12 which, when connected to and seated on, the hook end of a hot stick 14, provides for electrically insulated remote operation of a spring loaded ground clamp by a lineman holding the hot stick and pulling on, or releasing, a lever arm on the hot stick. The system provides increased safety for the lineman as the heavy, in the sense of having a strong spring force, spring providing the spring loading of the clamp has a high spring force to overcome; the object being that the lineman is forced to use the hot stick tool in order to overcome the spring's spring force and cannot usefully operate the spring loaded ground clamp manually without the hot stick tool.

Figure 1:
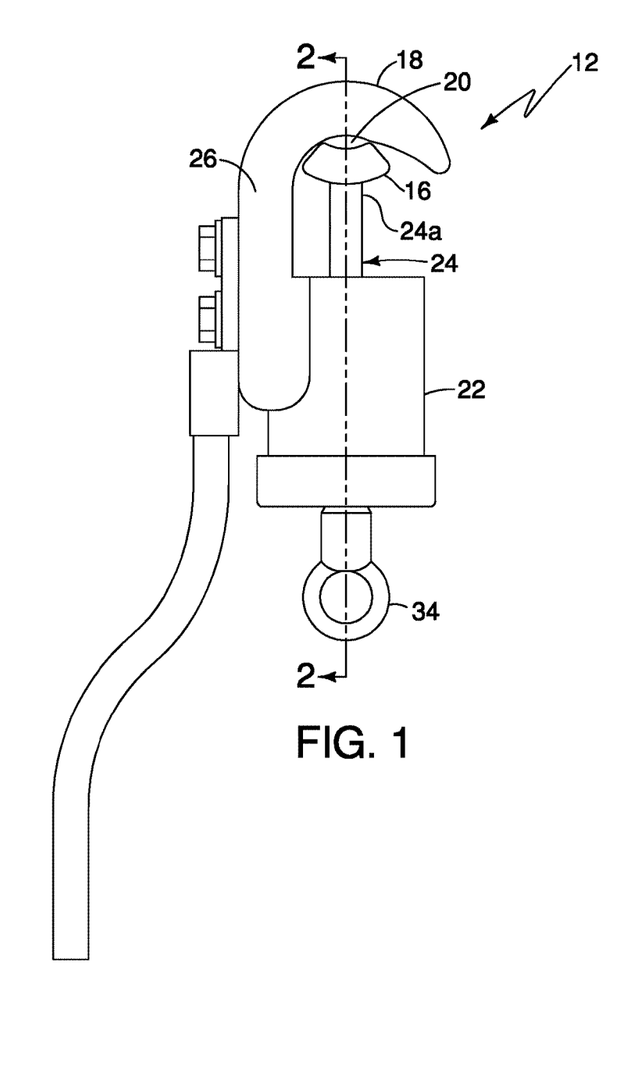
FIG. 1 is a side elevation view of a ground clamp according to the present specification.
Figure 2:
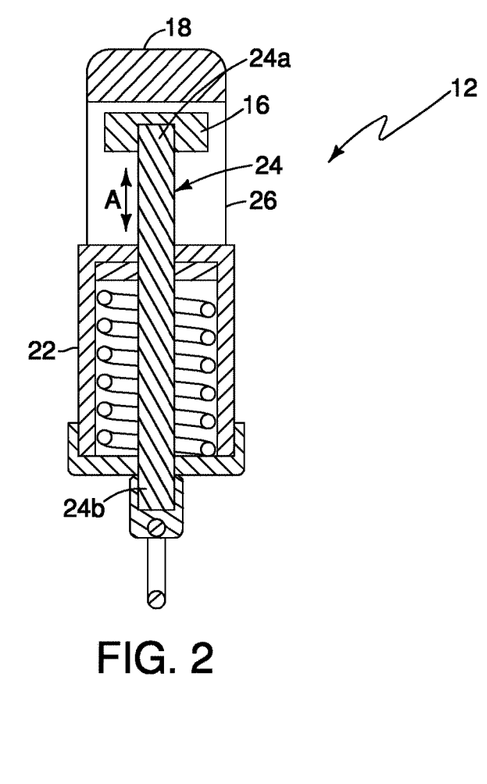
FIG. 2 is a section view along line 2-2 in FIG. 1.
Figure 3:
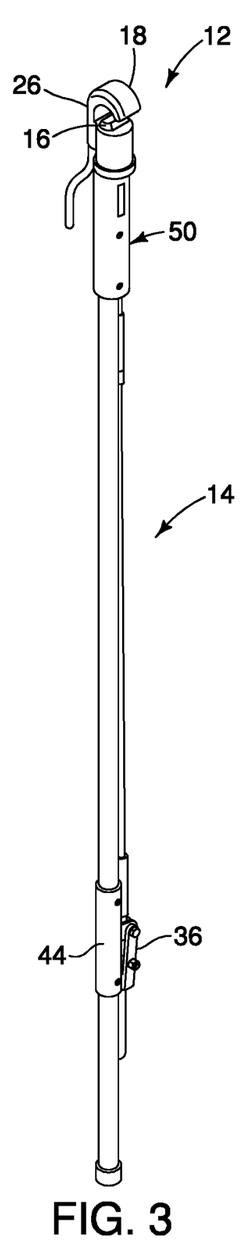
FIG. 3 is, in perspective view, the ground clamp of FIG. 1 mounted on the end of a customised hot stick with a ground clamp tensioning assembly according to the present specification, with the jaws of the clamp open.
Figure 4:
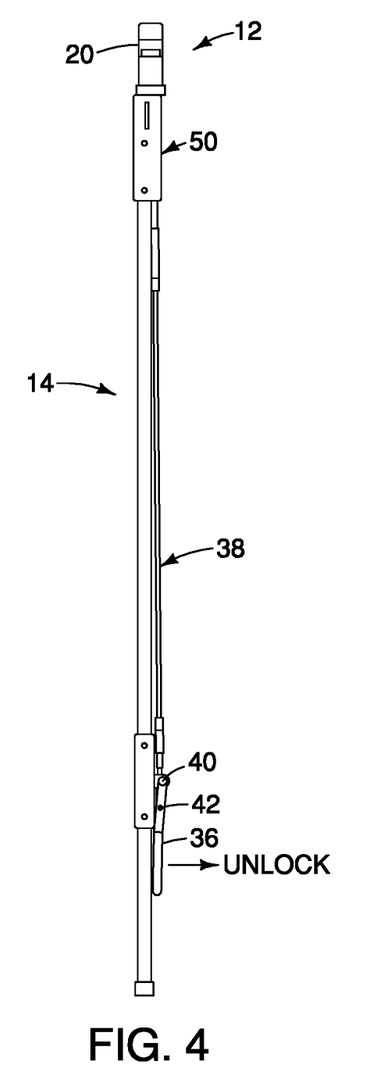
FIG. 4 is the spring loaded ground clamp system of FIG. 3 in front elevation view.
Figure 5:
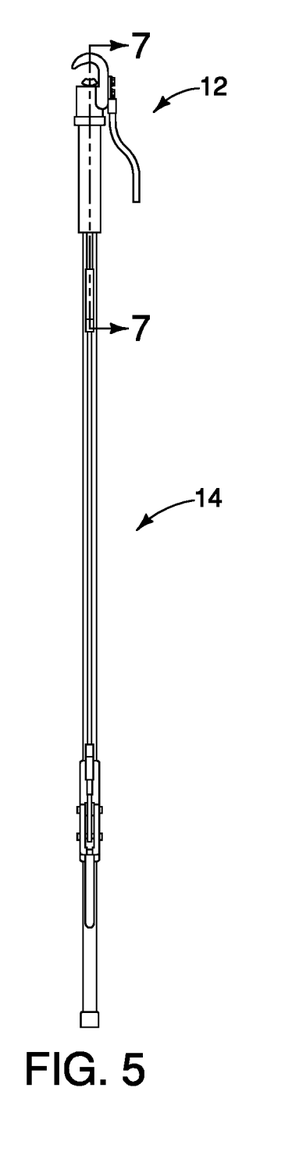
FIG. 5 is the spring loaded ground clamp system of FIG. 4 in side elevation view.
Figure 6:
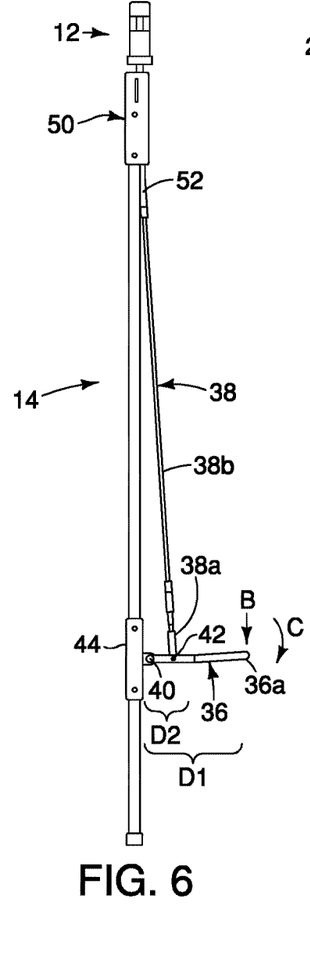
FIG. 6 is the spring loaded ground clamp system of FIG. 5, with the jaws of the clamp closed.
Figure 7:
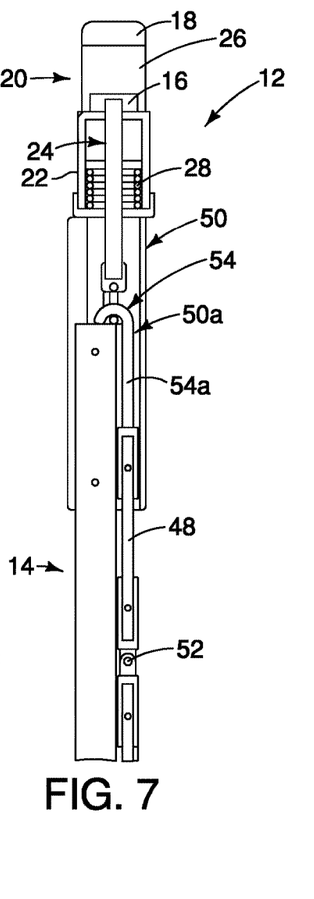
FIG. 7 is a section view along line 7-7 showing the ground clamp in its open position with spring completely compressed in FIG. 5.
Figure 8:
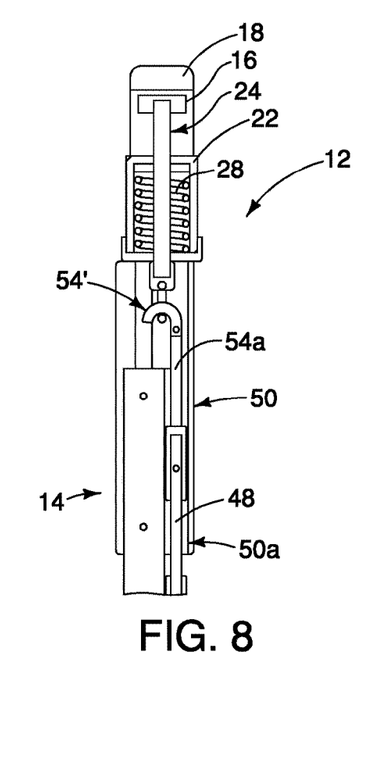
FIG. 8 is the section view of FIG. 7 showing the jaws of the clamp closed with the spring uncompressed, and showing an alternative embodiment of the hook and hook shank wherein the hook is pivotally mounted on the shank.

Thus as seen in FIGS. 1 and 2, ground clamp 12 includes a first or movable jaw 16 and a second or fixed jaw 18. The first and second jaws 16 and 18 are in opposed facing relation so as to define a conductor-receiving gap 20 therebetween. Serrations or teeth 16*a* and 18*a*, seen in FIG. 16, may be formed on the opposed facing surfaces of the movable jaw 16 and fixed jaw 18 respectively. Spring housing 22 contains a piston 24 slidably journaled therethrough for translation of the piston in direction A. An upper end 24*a* of piston 24 is coupled to first jaw 16. The second fixed jaw 18 is formed as a hook and mounted to spring housing 22 by shank 26 so as to maintain the first and second jaws in their opposed facing relation oppositely disposed about gap 20.

Figure 16:
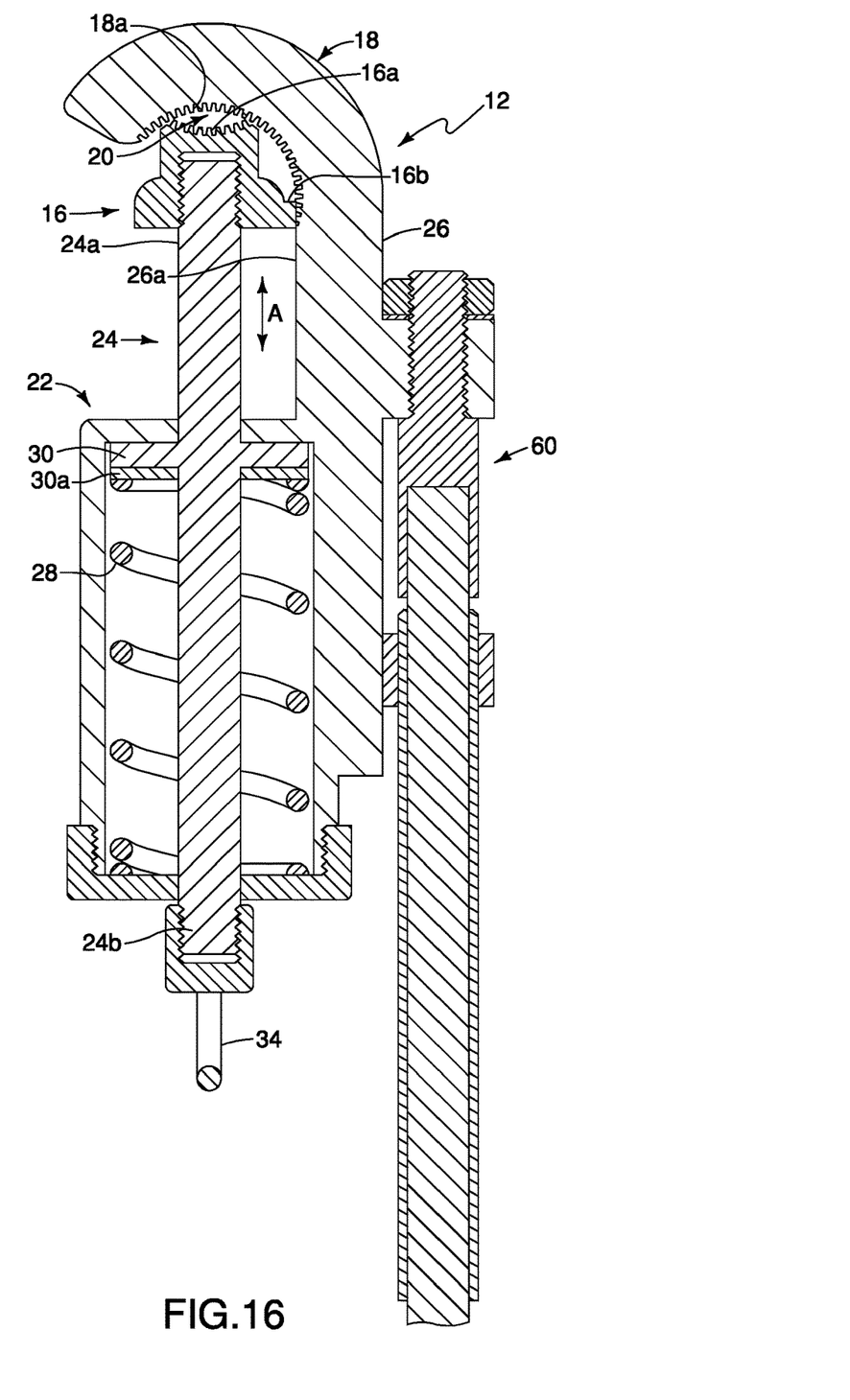
FIG. 16 is a sectional view, bisecting the rear perspective view of FIG. 17, of an alternative embodiment of the ground clamp of FIG. 1 showing serrations or teeth formed on the opposed facing surfaces of the fixed and movable jaws with the jaws closed and the use of a threaded ferrule to connect the grounding cable to the ground clamp.
Figure 17:
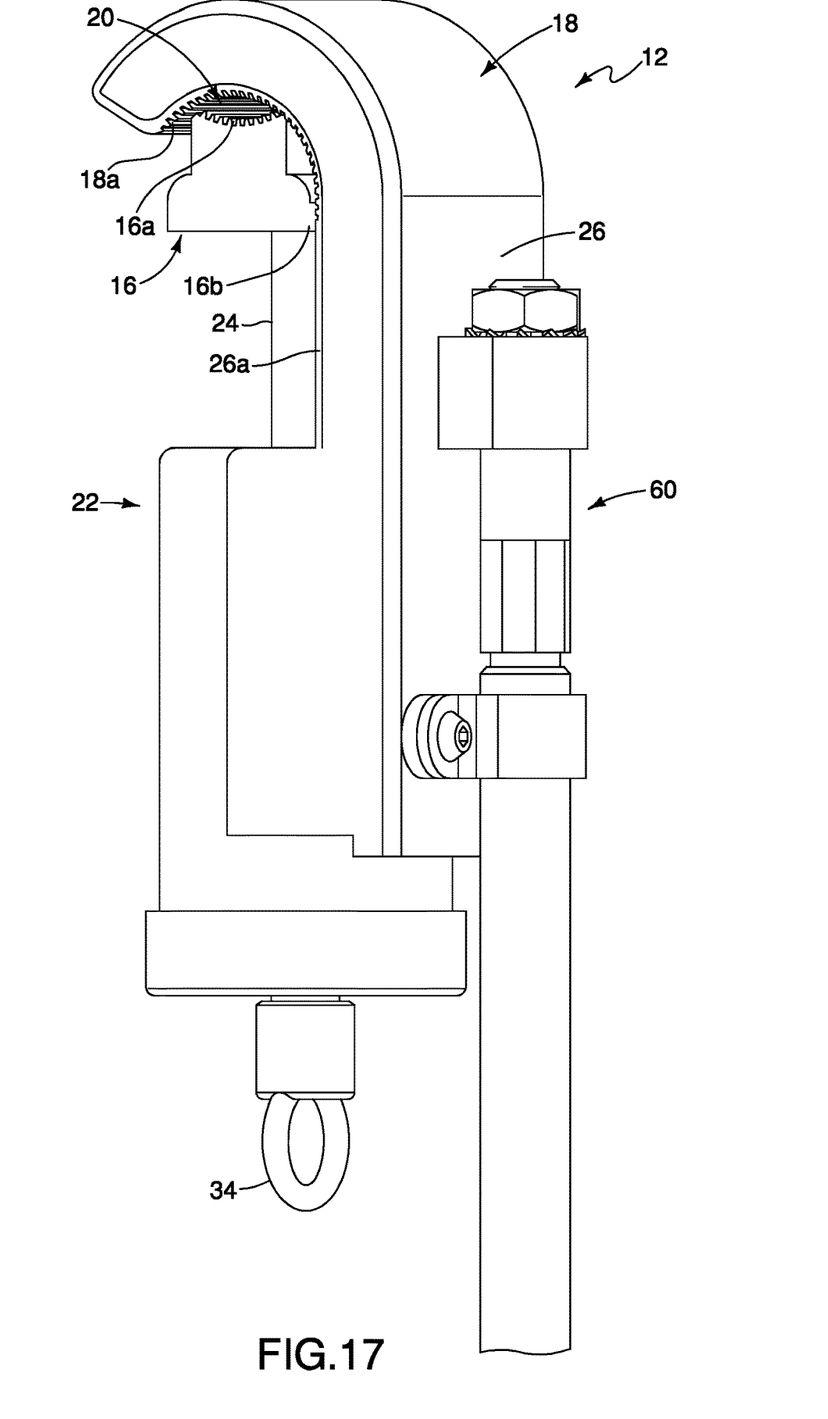
FIG. 17 is, in rear perspective view, the ground clamp of FIG. 16 with the jaws closed.

Spring 28 is mounted in spring housing 22. Annular flange 30 is mounted to piston 24 within housing 22 so as to couple piston 24 onto spring 28. Advantageously, an electrically conductive member such as washer 30*a*, seen in FIG. 16, is interleaved between flange 30 and the top end of spring 28. Washer 30*a* is rigidly mounted, for example by welding, onto the top end of spring 28 so that washer 30*a* and spring 28 are electrically connected. A second electrically conductive member such as a second washer may also be welded or otherwise mounted so as to be electrically rigidly connected to the lower end of the spring. Jaws 16 and 18, shank 26, housing 22 and piston 24 are metal or otherwise rigid and electrically conductive.

Figure 9:
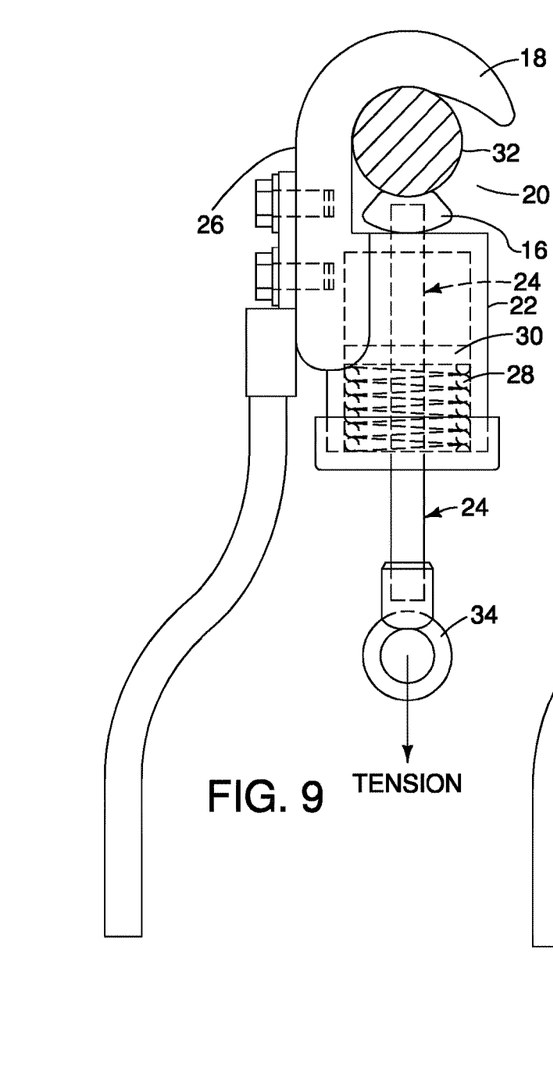
FIG. 9 is, in partially cutaway view, the ground clamp of FIG. 1 with the clamp jaws clamping a conductor having a maximum diameter that can be accommodated in the illustrated embodiment.
Figure 10:
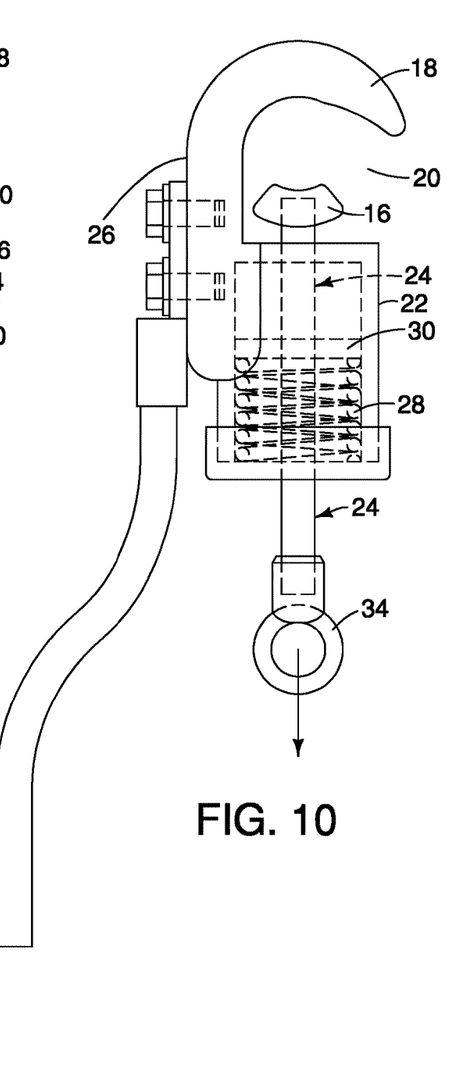
FIG. 10 is the view of FIG. 9 with the clamp jaws partly closed so as to clamp a slightly smaller diameter conductor.
Figure 11:
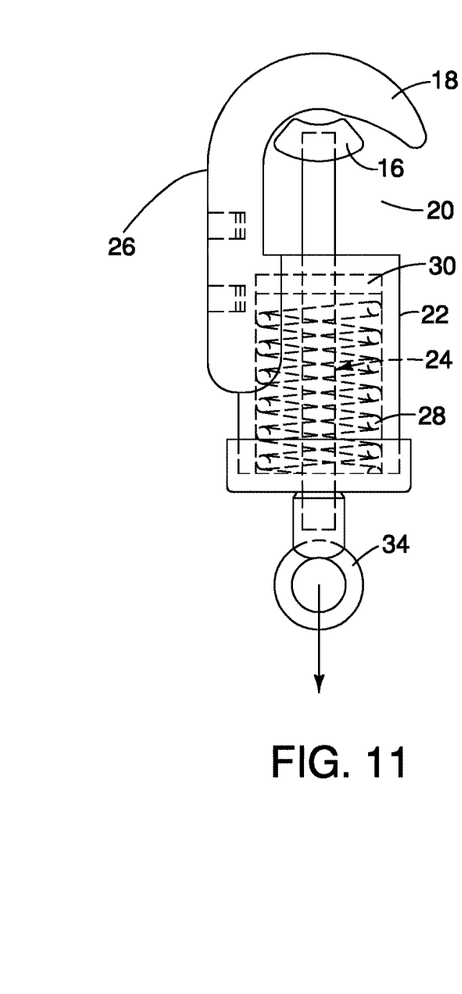
FIG. 11 is the view of FIG. 10 with the clamp jaws closed to accommodate a small diameter conductor.
Figure 12:
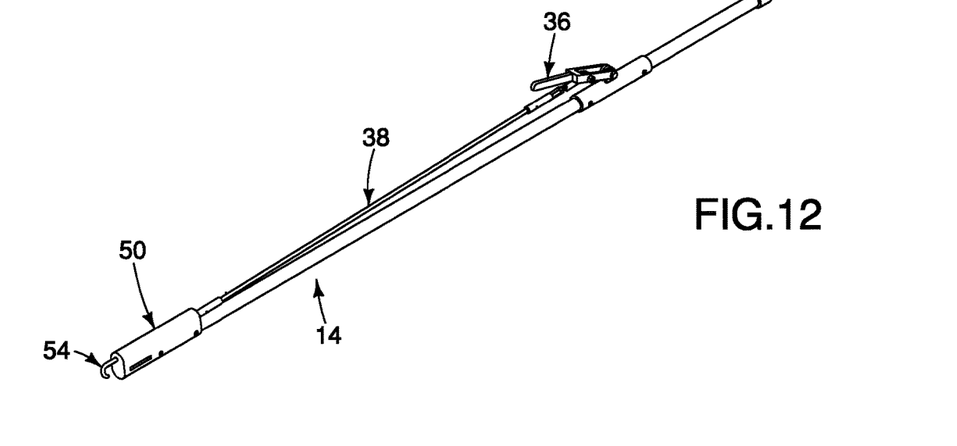
FIG. 12 is, in perspective view, the hot stick of the system shown in FIG. 3.
Figure 13:
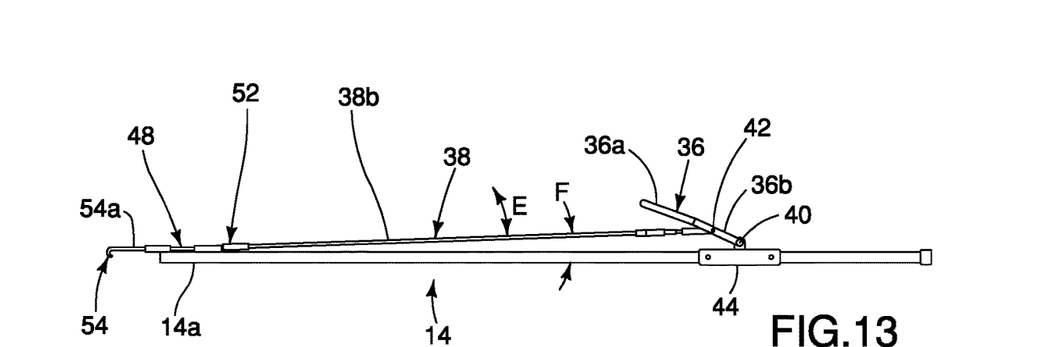
FIG. 13 is, in side elevation view, the hot stick and tensioning assembly of FIG. 12, with the hot stick head removed.
Figure 14:
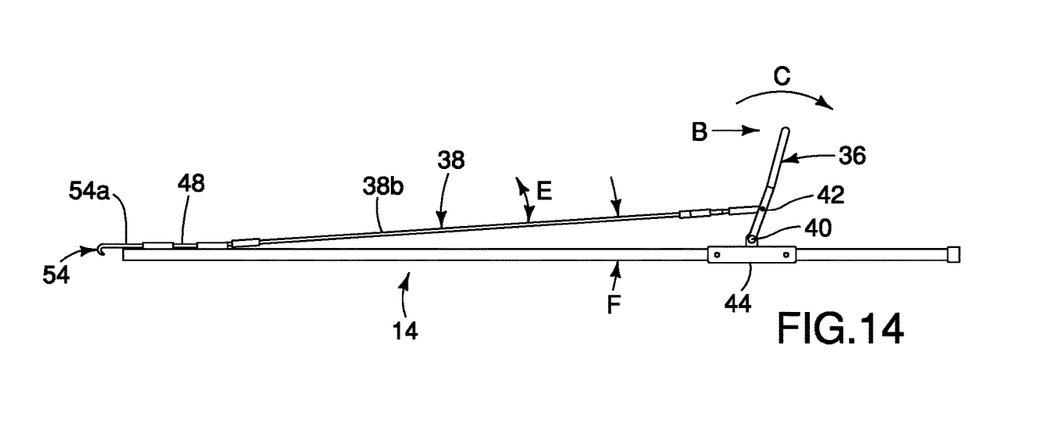
FIG. 14 is the view of FIG. 13 showing the tensioning assembly on the hot stick in its partly tensioned position with the hot stick head removed.

Spring 28 presses against washer 30*a* and flange 30 on piston 24 so as to resiliently urge piston 24 and first jaw 16 towards the second jaw 18 with a force governed by the spring force of spring 28. Translation of first jaw 16 towards second jaw 18 at least partially closes the gap 20 so as to clamp a conductor 32, shown diagrammatically in FIG. 9, between the jaws thereby forming an electrical connection between the ground clamp 12 and the conductor 32. A grounding cable 6 is mounted to ground clamp 12. This may for example be by means of bolts 8 affixing metal flange 6*a* to housing 22 or by means of a threaded ferrule 60 affixed to housing 22 as seen in FIG. 16, so as to provide an electrically conductive path from the ground clamp to the grounding cable. Ferrule 60 may be mounted parallel to the spring housing and shank, or may be angled outwardly therefrom to provide more space between the eye on the piston rod and the grounding cable for ease of attaching the end of the hot stick.

Serrations or teeth 16*a*, 18*a* seen in FIG. 16 are postulated to improve the electrical connection with conductor 32 when conductor 32 is in gap 20 and the clamp is closed as the exterior surface of conductor 32 is typically comprised of aluminum strands. As used herein, serration or teeth are referred to interchangeably and include other surface roughening including striation, corrugation, or the like used to increase surface friction. Spring 28 has, as described herein, a large and forceful spring strength so that the spring will function as a lock-out preventing manual actuation of the ground clamp without the mechanical advantage provided by the lever mechanism on the hot stick as described by way of example below. The large spring strength provides forceful positive contact of the ground clamp jaws onto the conductor sufficient to provide electrical connectivity for proper grounding which may avoid burning or welding of the jaws onto the conductor in the event of an extreme electrical surge as discussed below.

In the embodiment of FIGS. 16-20, moveable jaw 16 may include a linear flange 16*b* which rides up and down in direction A against shank flat face 26*a* with the movement of piston rod 24. This assists in maintaining the electrical connection between jaws 16, 18, and also resists twisting of jaw 16 about the longitudinal axis of piston rod 24.

The large spring strength, combined with the penetrating bite of the teeth penetrating the outer surface of the conductor, whether the conductor is a stranded cable or bus pipe for example, provides for improved electrical contact between the grounding clamp and the conductor, especially where the outer surface of the conductor may be fouled, corroded, etc. The serrations or teeth provide force concentrations magnifying the spring force so that the serrations or teeth are driven slightly into the surface of the conductor to thereby improve the electrical connection of the ground clamp to the conductor and to assist in anchoring the ground clamp in its desired position on the conductor. In situations where the exterior of the conductor is fouled, dirty, corroded or otherwise coated so that the exterior of the conductor may not form a good electrical connection with the surface of a jaw that is merely pressed against the surface of the conductor, instead of the lineman attempting to clean the conductor to make a better electrical contact, the serrations or teeth, because of their high force concentrations when driven by the spring force against the conductor, penetrate through not only the dirt, corrosion or other insulating coating that has formed over time and exposure to the environment or weather on the conductor, but also penetrate slightly into the outer surface such as the aluminum strands of a stranded cable conductor to make a clean or improved electrical contact.

Conventionally applicant is aware of linemen attempting to partially clean the exterior of a conductor by lightly clamping a conventional ground clamp onto the conductor and then rotating the ground clamp around the conductor to thereby clean up an electrical contact for the clamp when tightened thereon. The use of the hot stick and ground clamp having a lockout as described herein function as a cooperating system to provide the safety distance and electrical insulation of the hot stick and to dissuade a lineman from trying to manually couple or uncouple the ground clamp from the conductor. The use of a hot stick makes it more difficult to clean an electrical contact area on the conductor as, for example, the ground clamp when mounted on the head of the hot stick cannot then easily be rotated about the conductor. The use of serrations or teeth 16*a*, 18*a* assist in overcoming that drawback of having to use the hot stick in order to overcome the lockout and open the ground clamp jaws.

In alternative embodiments, the serrations or teeth may be provided on either the upper or lower jaw, with the other jaw being smooth or having a less aggressively shaped surface, or the serrations or teeth may be more aggressive on one jaw or the other. For example, the serrations or teeth on the driven or movable jaw may be more aggressively pointed in the instance where the driven jaw has a smaller surface area, and a lesser number of teeth than the fixed jaw, thus a higher force concentration for the teeth on the driven jaw for a given spring strength. By way of example, not intended to be limiting, the teeth may each come to a pointed vertex and have a height of $\frac{1}{32}$ of an inch. In other embodiments, the teeth may each have a vertex that is squared off, or the teeth may have a combination of pointed, rounded, and squared off vertices. Preferably, teeth are formed on at least the movable jaw.

Advantageously spring 28 is a helical coil spring having a strong, spring force, for example in the range of 140 pounds force to commence compression of the spring, to 250 pounds force required to fully compress the spring. Ideally the spring force would be linear, that is for example, 200 pounds force required to compress the spring from the start to fully compressed. The strong spring force and the requirement to use a hot stick to open the ground clamp, improve the safety to the workers, not allowing them to open the clamp by hand and putting them at a safe distance at the end of the hot stick from the clamp when opening.

An optimized balance between a strong spring strength, so that a lineman must use a hot stick to open and close the jaws, and the degree of aggressive profile of the teeth or serrations on the jaws so as to obtain a maximum unobstructed electrical connection between the teeth or serrations and the conductor without damaging the surface of the conductor, is important for optimizing the safety of the ground clamp when in use. The electrical connection of the jaws on the conductor, and the electrical connection between the elements of the ground clamp, for example between the first and second jaws via the shank, housing, spring, and piston, has been found to be important.

Testing of prototype ground clamps according to the present specification, wherein the testing simulated the effect on the ground clamps due to extreme electrical surges, such as might be encountered during a lightning strike or electrical fault while a ground clamp is electrically bonded onto a conductor, resulted in what appeared to be burning and/or welding of the surfaces between the jaws, or the teeth on the jaws, and the conductor, and resulted in what appeared to be burning and/or welding between surfaces of various components of the ground clamp. For example, it was found in at least one instance that the spring had welded to the inside of the spring housing where the spring came in apparently somewhat close proximity to the wall of the housing. This possibly would in use in the field prevent or inhibit the removal of the ground clamp from the conductor as the piston would not be able to translate to open the jaws. It is postulated that increasing the efficacy of the electrical contact of the electrical connections between the jaws and conductor, and between the components of the ground clamp may alleviate or reduce the observed burning or welding therebetween. Consequently, increasing the spring strength may improve the electrical connections between the jaws and the conductor, and closing off the upper end of the spring (i.e. the end of the spring that moves) by for example the use of an electrically conductive member such as a washer bonded to the end of the spring, which then increases the contact surface area of the spring with the piston, and increasing the contact of the piston with the shank by for example the use of a contact flange on the movable jaw sliding over a corresponding contact surface on the shank, it is postulated may reduce the adverse effects of the electrical surge through the ground clamp.

The spring force is also selected so as to balance two competing human factors. To applicant's knowledge a lineman, using both of his hands, would be hard pressed to continuously pull a tension force between his hands of no more than approximately 150 pounds force. Keeping in mind that, in the present application, if a lineman was capable of that pulling force, it would in applicant's view still be very difficult for the lineman to translate that strength into compressing the spring 28 in the ground clamp so as to open the clamp's jaws 16 and 18, and then operating the ground clamp described herein in which the spring 28 has a spring force in full compression of at least 150 pounds force, without the assistance of the hot stick 14 also described herein. Without the use of the hot stick 14, the lineman would have to hold the ground clamp 12 in one hand, for example by grasping the ground clamp shank 26 which holds the two jaws in their alignment and hold the ground clamp-to-hot stick connector (for example the eye 34 extending from the lower end 24b of the piston 24 in the illustrated examples) in the other hand, and while pulling the two apart manually so as to open the jaws. Then, without releasing the tension, the lineman would have to reach out, for example from the bucket truck in which the lineman is standing and hook the open jaws of the ground clamp 12 over the conductor 32. Applicant is of the view that the lineman would if given the choice take the easier (and also safer) route and use the hot stick 14 with the tensioning assembly described herein.

Another human factor that applicant has taken into consideration in the design of the present ground clamp system, is the force that a lineman can exert on the lever arm 36 mounted on hot stick 14 when compressing the spring 28 in the ground clamp 12. Given the mechanical advantage provided by the lever arm 36, a lineman must still be able to fully compress the spring in the ground clamp using the tensioning assembly on the hot stick, which may become difficult where the spring has a very high spring force at full compression. Hence there will be an upper limit on the spring strength of the spring, above which a lineman may struggle to operate the tensioning assembly.

There will also be an upper limit on the spring strength of the spring, above which the lever arm 36 and tensioning rod linkage 38 may not withstand after repeated operation of the tensioning assembly, without the lever arm and linkage having to be heavy in order to be sufficiently strong. If the lever arm and tensioning linkage are overly rugged and heavy, the hot stick may become cumbersome. In applicant's opinion, a heavy and cumbersome hot stick is less likely to be used by a lineman than one that is relatively light and thus more easily used. The design factor to be considered then becomes whether a relatively lightweight lever arm 36 and associated tensioning rod linkage 38 will withstand the repeated force necessary to repeatedly fully compress the spring 28 in the ground clamp 12 when fully opening the clamp's jaws 16 and 18. In the illustrated example in FIGS. 3-7, it takes approximately 160 pounds force to fully compress spring 28.

The lever arm 36 provides a mechanical advantage to the lineman. This allows the lineman to pull the required compression force on the ground clamp spring 28 via the lever arm 36 and tensioning rod linkage 38 to open the jaws 16 and 18 while using only one hand to pull on the lever arm 36 all the way to the locked over center position, and then manipulating the hot stick 14 with both hands. As seen by way of example in the illustrations, for example FIGS. 6, and 12-14, the mechanical advantage may in one embodiment be in the range of approximately 3:1 to 4:1. The approximate range of mechanical advantage may be seen by comparing in the figures the distance D1 (shown in FIG. 6) between the lever arm hinge 40 (where the lever arm 36 is pivotally mounted to hot stick 14), and the handle end 36a of lever arm 36, to the distance D2 between the lever arm hinge 40 and the pivoting connection (pinned hinge 42) where the rod linkage 38 is joined to lever arm 36 by an adjustable threaded connection between 38a and 46. Distance D2 is alternatively referred to herein as the mechanical advantage distance of the lever arm.

Thus, by way of example, if the required compression force to fully compress spring 28 is 160 pounds force, then, using lever arm 36, the lineman would have to pull in direction B on lever arm handle end 36a using approximately 40 pounds force if the mechanical advantage is approximately 4:1. Using the same mechanical advantage ratio of 4:1, if the spring force of spring 28 at full compression is 240 pounds force, then the lineman would have to pull on lever arm 36 with 60 pounds force. If the mechanical advantage ratio is only 3:1, then in the latter example, the lineman would have to pull on the lever arm with 80 pounds force, which in applicant's opinion is likely the upper limit, and possibly more than the upper limit, of what a lineman may possibly be able to achieve.

Advantageously, as illustrated, lever arm 36 may be mounted on hot stick 14 using a collar or sleeve 44, wherein the lever arm hinge 40 is mounted onto sleeve 44, for example midway along its length. The length of sleeve 44 assists in distributing the load on hinge 40 to hot stick 14 during rotation of the lever arm in direction C in order to open the ground clamp's jaws 16 and 18. Lever arm hinge 40 is elevated off sleeve 44 by a small distance, sufficient to provide for over-center locking of lever arm 36 against hot stick 14 once lever arm 36 has been fully rotated in direction C. The length of rod linkage 38 is adjustable so that spring 28 is fully compressed as lever arm 36 comes to its fully rotated over center and locked position parallel to hot stick 14 upon completion of full rotation in direction C. Preferably, as lever arm 36 is rotating about hinge 40 into its over-center position flush along hot stick 14, a small force component from the tension on the tensioning rod linkage 38 urges lever arm 36 against hot stick 14. This retention force may for example be in the order of five pounds force. Thus, in that example, the lineman would have only to exert five pounds force pulling lever arm 36 away from hot stick 14 in order to release lever arm 36 from its over-center locked position closing the ground clamp.

Figure 15:
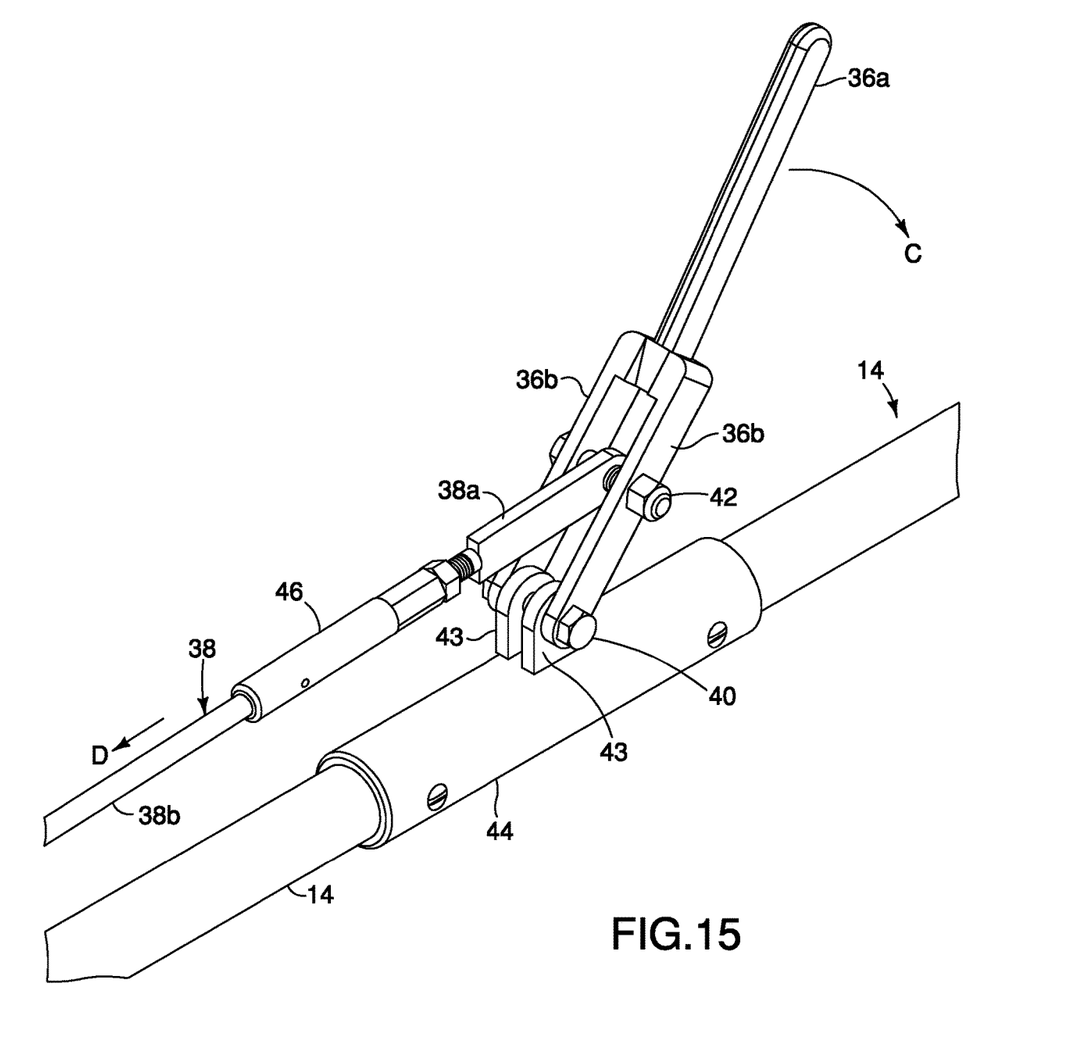
FIG. 15 is an enlarged perspective view of the lever arm and tensioning rod linkage of the tensioning assembly in its partly tensioned position.

As seen in FIG. 15, in the illustrated embodiment, not intended to be limiting, lever arm hinge 40 is mounted to, so as to be raised off, sleeve 44, on a pair of parallel mounting ears 43. Parallel fork arms 36b on lever arm 36 extend from the handle end 36a to lever arm hinge 40, where the ends of fork arms 36b are pinned to their corresponding mounting ears 43 for rotation of lever arm 36 in direction C so as to rotate lever arm 36 relative to sleeve 44 and hot stick 14. Tensioning rod linkage 38 includes a planar threaded member 38a rotationally coupled at one end to pinned hinge 42 on fork arms 36b, and at the other end to a length adjustment coupling member 46. Length adjustment coupling member 46 may be mounted in threaded engagement to planar member 38a, or may be threaded at both female ends of member 46 in the manner of a turnbuckle, so as to allow selective lengthening or shortening of tensioning rod linkage 38. As lever arm 36 is rotated in direction C into its over-center locking position flush along hot stick 14, planar member 38a is nested between fork arms 36b and mounting ears 43 so as to allow tensioning rod linkage 38 to also lie flush along hot stick 14. When lever arm is unlocked from its over-center locked position by being rotated in a direction opposite to direction C, a small pulling force is required, for example approximately five pounds force, to provide the moment required to break open the over-center locking. As the rotation of lever arm 36 then continues, tensioning rod linkage moves in direction D thereby releasing the tension holding spring 28 compressed closing ground clamp. Spring 28 then urges piston 24 and first jaw 16 towards second jaw 18, at least partly closing gap 20, and clamping a conductor 32 located in the gap between the jaws 16 and 18 with the return spring force of spring 28. Preferably, spring 28 is substantially linear so that spring force is almost the same through all or substantially all of its full range of motion, that is from uncompressed to fully compressed.

Tensioning rod linkage 38 further includes at least a long, primary linkage member, or tie rod 38b, which may be an electrically insulated flexible rod such as made of fiberglass so as to be relatively light weight yet strong in tension. The length of tie rod 38b will depend on the length of hot stick 14. The longer the hot stick, the longer tie rod 38b. In the illustrated embodiment, tie rod 38b extends from coupling member 46 to a hook rod 48. Tie rod 38b is pivotally coupled to hook rod 48 by pinned hinge 52. Pinned hinge 52 allows rotation of tie rod 38b in direction E relative to hook rod 48. Hook rod 48 is slidably mounted in a longitudinally extending channel 50a in hot stick head 50 for translation of hook rod 48 along the hook end 14a of hot stick 14, parallel and snugly adjacent to hook end 14a of hot stick 14. The channel 50a in head 50 maintains hook rod 48 parallel to hot stick 14 during its translation along the hook end 14a.

Tie rod 38b does not however remain parallel to hot stick 14 as lever arm 36 is rotated. As lever arm 36 is rotated about lever arm hinge 40, pinned hinge 42 is correspondingly rotated through an arc about hinge 40. Because tie rod 38b is coupled to pinned hinge 42 via members 38a and 46, rotation of pinned hinge 42 in an arc swings tie rod 38b in direction E about pinned hinge 52, and correspondingly through a small included angle F formed between tie rod 38b and hot stick 14. The shorter the length of hot stick 14, the slightly greater the included angle F, and conversely the longer the length of hot stick 14, the slightly smaller the included angle F.

A hook 54 is mounted onto the end of hook rod 48 opposite to pinned hinge 52. The shank 54a of hook 54 is rigidly co-linear with hook rod 48, and is free to slide along the channel 50a in head 50 in which hook rod 48 is slidably mounted. Thus hook 54 is retractably mounted on the hook end 14a of hot stick 14. As tensioning rod linkage 38 is thus coupled to hook 54, rotation of lever arm 36 in direction C retracts hook 54 to or into the distal end 50b of head 50 on hot stick 14.

The hook end 14a of hot stick 14, and in particular head 50 is adapted to have spring housing 22 seat onto the end of head 50 when 54 hook is engaged with eye 34 and the hook retracted to a first retracted position by rotation of the lever arm in direction C so as to tension the tensioning rod linkage. A hollow guard having a bulbous cavity may optionally be mounted to the underside of the spring housing 22 so as to cover eye 34 while allowing insertion of hook 54 and the end of head 50 into the guard cavity so that a lineman may engage hook 54 with eye 34 inside the guard. The guard is intended to inhibit a lineman from attempting to use a shortcut to overcome spring 28 such as by inserting a hand held lever or handle device, for example a screwdriver, through eye 34 so as to provide the lineman with greater purchase to pull down on piston 24 with increased force.

In the first retracted position the hook 54 pulls on the eye 34 to seat the spring housing 22 onto head 50 at the first end of the hot stick. Continued and increasing tension on the tensioning rod linkage 38 by further rotation of lever arm 36 in direction C (away from the first end of the hot stick and towards the second, opposite, end of the hot stick) retracts the hook 54 to a second retracted position wherein the flange 30 on piston 24 compresses the spring 28 against its return biasing spring force so as to retract the first jaw 16 away from the second jaw 18 to thereby open the gap 20 so as to accept a conductor 32 therein.

Figure 18:
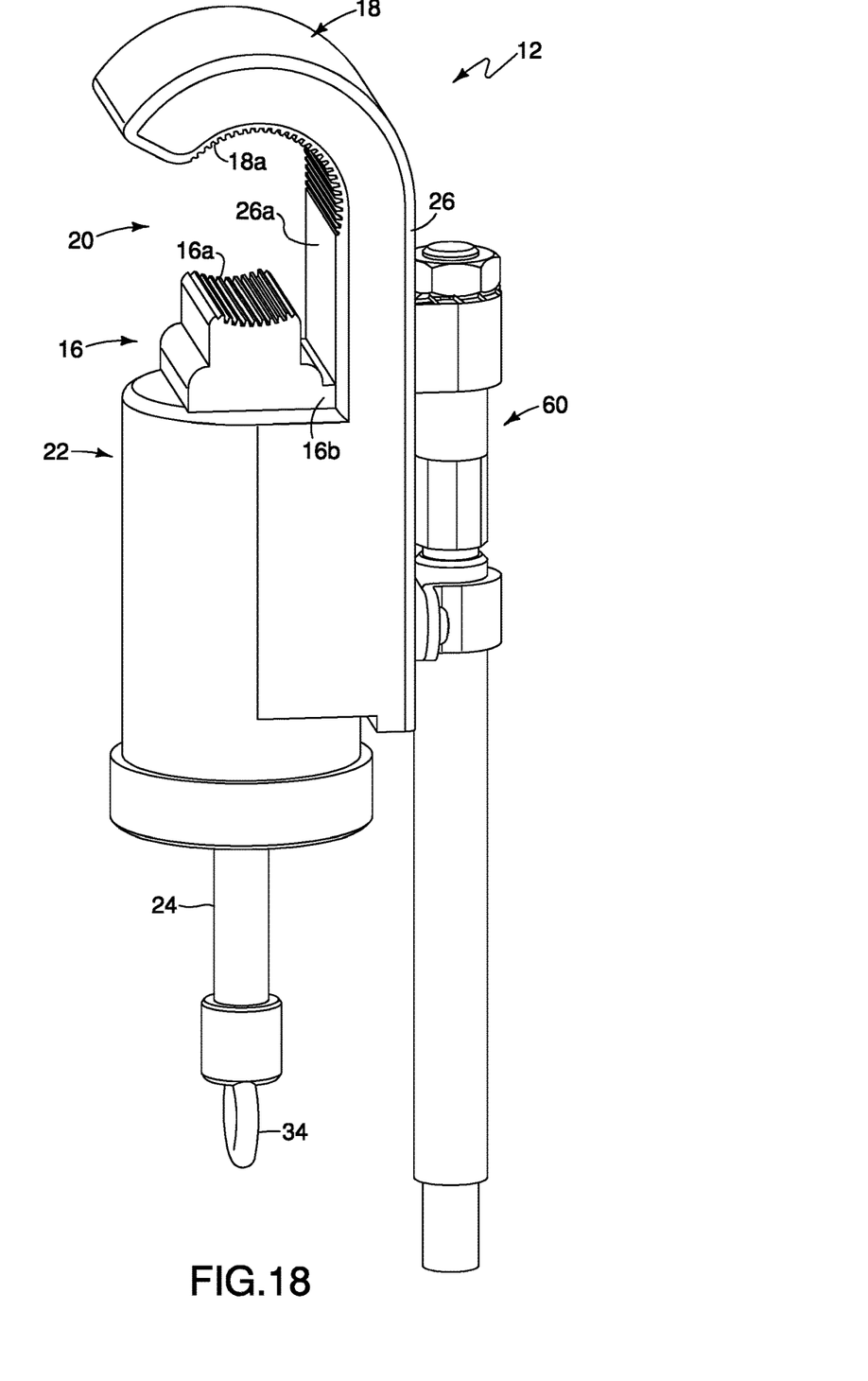
FIG. 18 is, in front perspective view, the ground clamp of FIG. 17, with the jaws open.
Figure 19:
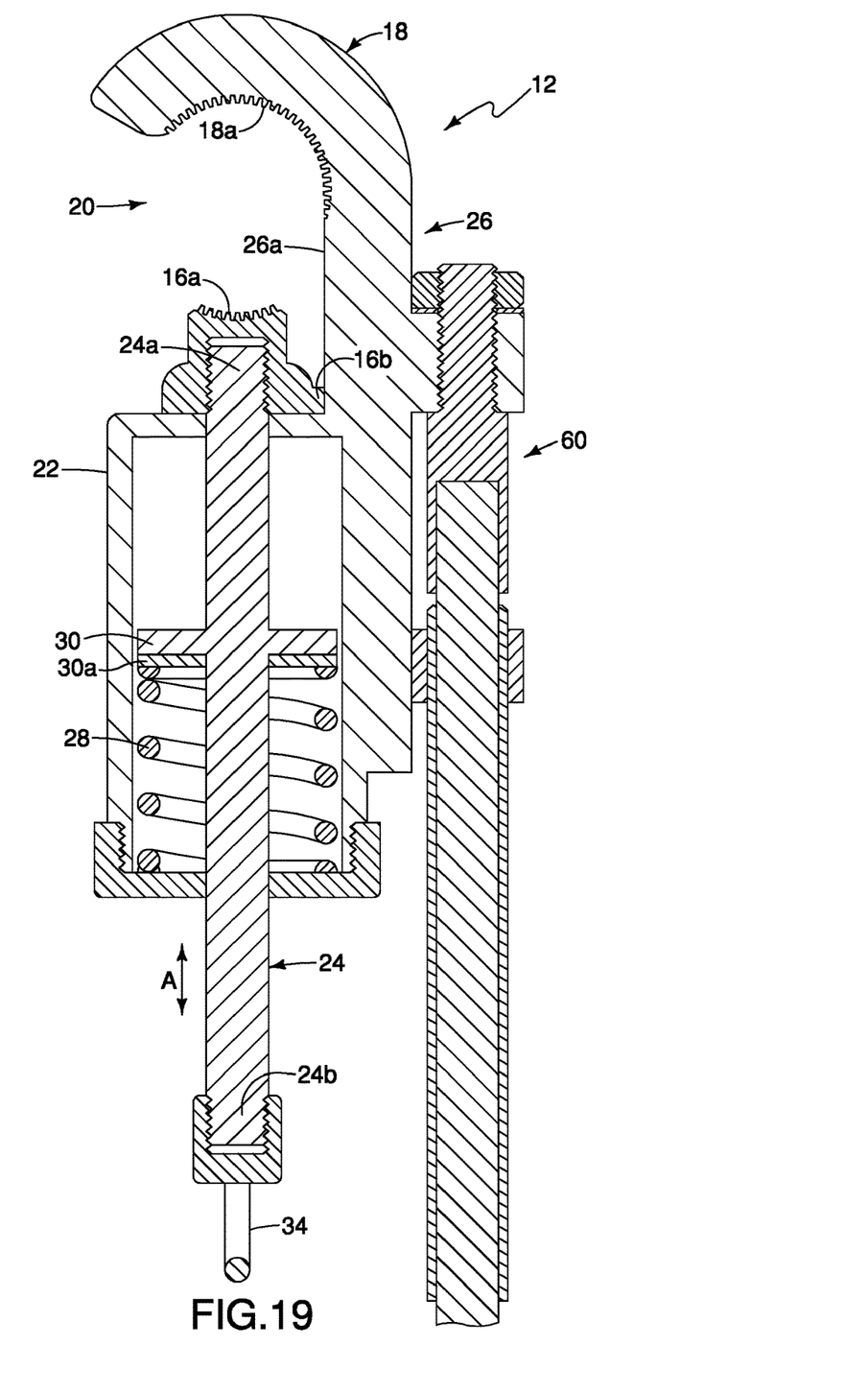
FIG. 19 is a sectional view bisecting the ground clamp of FIG. 18.
Figure 20:
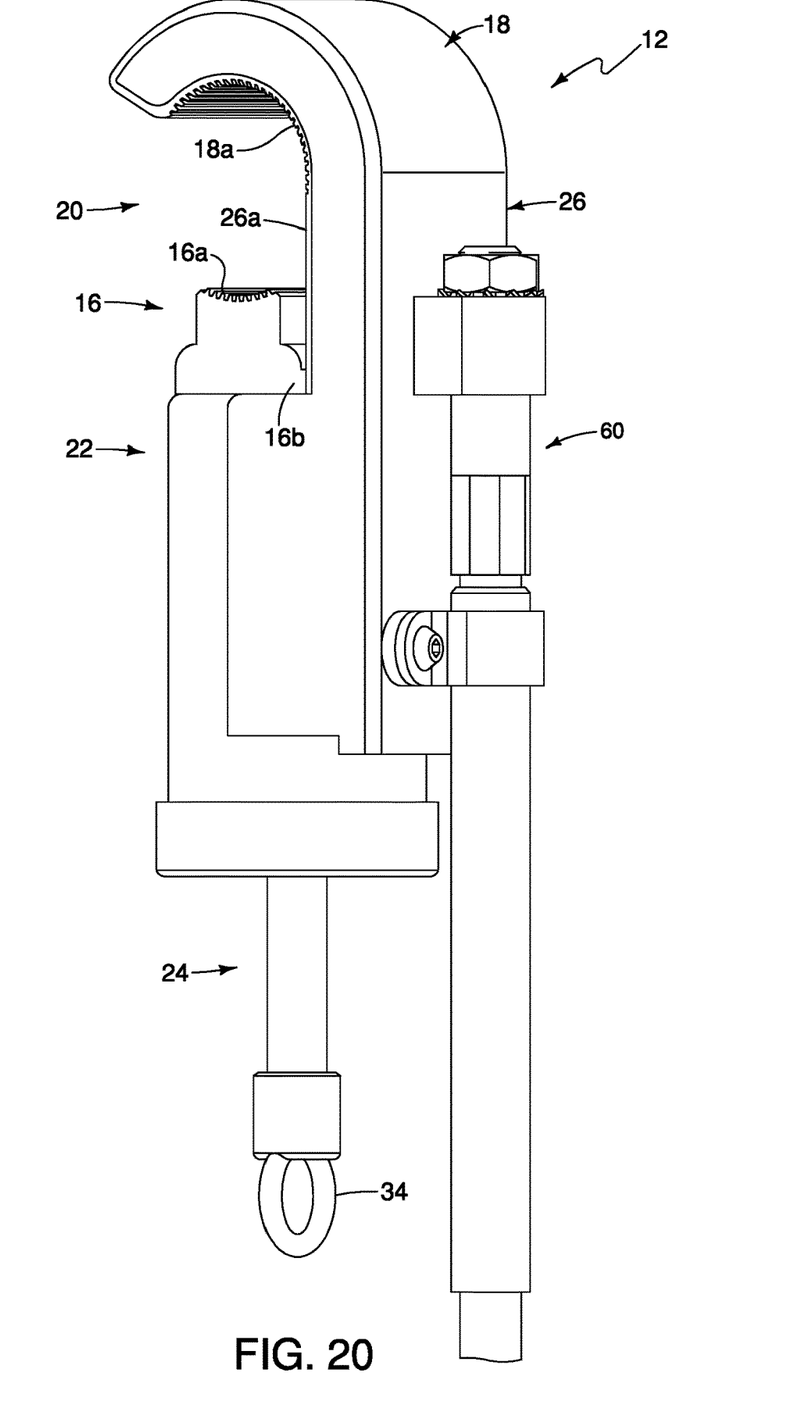
FIG. 20 is, in rear perspective view, the ground clamp of FIG. 18.

In the embodiment of FIG. 16, ground clamp 12 may advantageously provide for a range of sizes of gap 20 when the jaws are open such as seen in FIGS. 18-20, for example in the range of 7/32 of an inch to 1¾ inches, so that ground clamp 12 may in applicant's experience accommodate clamping a majority of conductors 32 found in the field. Spring 28 may have a height of four inches when mounted in housing 22 to allow for the required range of motion of piston 24 in direction A. In the illustrated embodiment, the four inch long spring, having its top end closed around the piston rod and electrically connected to washer 30a engaging flange 30, and having four active coils using 7/32 inch diameter wire, may it is postulated provide the required range of motion and spring force range of approximately 145 to 220 pounds force. As would be known to one skilled in the art, the spring force may be increased by increasing the wire size. In the illustrated embodiment, piston rod 24 may have a diameter of ⅝ of an inch. A second washer, not shown, may be mounted to the bottom of the spring so as to close the bottom of the spring around the piston rod.

While the embodiments are described with reference to various implementations and exploitations, it will be understood that these embodiments are illustrative and that the scope of the inventive subject matter is not limited to them. Many variations, modifications, additions, and improvements are possible. Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. In the claims that follow, reference to either serrations or teeth is intended to be a reference to serrations and teeth collectively in each instance.

The invention claimed is:

1. A grounding clamp system comprising:
  (a) a ground clamp head, including:
    a first jaw,
    a second jaw in opposed facing relation to the first jaw so as to define a gap therebetween,
    a housing containing a piston slidably mounted therein, wherein a first end of the piston is mounted to the first jaw, and wherein the housing is rigidly coupled to the second jaw so as to maintain the first and second jaws in their opposed facing relation,
    a linear spring mounted in the housing and coupled to the piston to resiliently urge the piston and the first jaw towards the second jaw so as to resiliently close the gap between the first and second jaws, wherein the spring has a spring force in the range of 140 to 250 pounds force required to compress the spring,
    a hot stick connector extending from a second end of the piston opposite the first end of the piston,
  (b) a hot stick having a hook retractably mounted in a first end of the hot stick, a rod linkage coupled to the hook at a first end of the rod linkage, and coupled at a second end of the rod linkage to a lever arm, wherein the lever arm is pivotally mounted on the hot stick, at one end of the lever arm, at a second end of the hot stick opposite the first end of the hot stick, and wherein the second end of the rod linkage, opposite the first end of the rod linkage, is mounted to the lever arm at a mechanical advantage distance along the lever arm and away from the hot stick,
    wherein the first end of the hot stick is adapted to have the housing seat thereon when the hook is engaged with the hot stick connector and the hook retracted to a first retracted position by rotation of the lever arm in a first direction so as to tension the rod linkage, wherein in the first retracted position the hook pulls on the hot stick connector to seat the housing onto the first end of the hot stick, and wherein continued and increasing tension on the rod linkage by further rotation of the lever arm in the first direction away from the first end of the hot stick and towards the second end of the hot stick retracts the hook to a second retracted position wherein the hot stick connector and piston compress the spring against a return biasing spring force of the spring so as to retract the first jaw away from the second jaw to thereby open the gap,
    wherein a flange on the piston is adapted to engage the spring so as to electrically couple the first jaw and the piston to the spring and to compress the spring upon the continued and increasing tension on the rod linkage,
    and wherein when the lever arm is rotated in a second direction opposite to the first direction, the return biasing spring force of the spring urges the first jaw towards the second jaw to thereby at least partly close the gap,
    whereby, with the lever arm rotated in the first direction to open the gap between the first and second jaws, the first and second jaws are positionable to place a conductor into the gap, and whereafter, with the lever arm rotated in the second direction to at least partly close the gap, the conductor is clamped between the first and second jaws.

2. The system of claim 1, wherein at least one of opposed facing surfaces of the first and second jaws include serrations formed thereon so as to provide penetrating spring force concentration to, and electrical connection with, the conductor clamped between the first and second jaws.

3. The system of claim 2 wherein the at least one of opposed facing surfaces of the first and second jaws are concave surfaces, curved so as to conform to a curved outer surface of the conductor clamped between the first and second jaws so as to optimize the penetrating spring force concentration to, and electrical connection with the conductor.

4. The system of claim 3, wherein both the first and second jaws are said concave surfaces, and wherein the first jaw is a moveable driven jaw and the second jaw is a fixed jaw wherein the serrations are formed on at least the first jaw, and wherein the first and second jaws have corresponding first and second gripping surfaces in opposed facing relation, and wherein the first gripping surface is smaller than the second gripping surface whereby the penetrating spring force concentration of the first gripping surface acting on the conductor is increased relative to the penetrating spring force concentration of the second gripping surface acting on the conductor.

5. The system of claim 4, wherein the serrations are formed on both the first and second gripping surfaces.

6. The system of claim 3, wherein the first jaw includes a contact flange and wherein a shank of the second jaw includes a contact face, and wherein the contact flange is in sliding contact with the contact face as the piston translates to open and close the gap between the first and second jaws.

7. The system of claim 6, wherein the contact flange is linear, and the contact face is planar and in electrically conductive contact with the contact flange.

8. The system of claim 1, wherein the rod linkage is pivotally mounted to the lever arm.

9. The system of claim 8, wherein the rod linkage comprises first and second linear rods, wherein the first linear rod is coupled at a first end thereof to a shank of the hook and is slidably mounted to the first end of the hot stick so as to translate linearly along and parallel to the first end of the hot stick, and wherein the first linear rod is pivotally coupled at a second end thereof, opposite the first end of the first linear rod, to a first end of the second linear rod, a second end of the second linear rod being said pivotally mounted to the lever arm, and wherein the second linear rod is pivotable relative to the first linear rod so as to form an included angle between the second linear rod and the hot stick as the lever arm is rotated to open and close the first and second jaws.

10. The system of claim 9, wherein the second end of the hot stick includes a handle end of the hot stick, and wherein the lever arm is an over-center lever arm releasably lockable into an over-center position when fully rotated in the first direction until a handle end of the lever arm is flush against the handle end of the hot stick.

11. The system of claim 10, wherein the base end of the lever arm is a fork, and wherein the fork is pivotally mounted to a pair of correspondingly spaced apart mounting ears on the hot stick, so as to elevate the base end of the lever arm off the hot stick, and to thereby allow the second linear rod to lie flush along the hot stick when the lever arm is in the over-center and locked position.

12. The system of claim 10 further comprising a hot stick head mounted on the first end of the hot stick, wherein a linear channel is formed in and along the hot stick head, and wherein the first linear rod is slidably mounted in the channel.

13. The system of claim 10, wherein the included angle is a small angle.

14. The system of claim 13, wherein the small angle is substantially in the range of 1 to 3 degrees.

15. A method of using the system of claim 10 by a lineman, comprising the steps of:
  providing the system of claim 10,
  opening the first and second jaws by pulling the lever arm to its over-center and locked position,
  while holding the hot stick at its second end, manipulating the hot stick so as to position the ground clamp head to capture the conductor in the gap between the first and second jaws,
  unlocking the over-center locked lever arm and rotating the lever arm to de-tension the rod linkage thereby closing the first and second jaws onto the captured conductor.

16. The method of claim 15 further comprising reversing the rotation of the lever arm so as to re-tension the rod linkage to thereby open the first and second jaws, whereafter the ground clamp head is removed from the conductor.

\* \* \* \* \*